(12) United States Patent
Prochnow et al.

(10) Patent No.: US 8,883,231 B2
(45) Date of Patent: Nov. 11, 2014

(54) PACKAGED ARTIFICIAL SOFT BAITS

(75) Inventors: John A. Prochnow, Spirit Lake, IA (US); Charles J. Cihlar, Milford, IA (US)

(73) Assignee: Pure Fishing, Inc., Spirit Lake, IA (US)

( * ) Notice: Subject to any disclaimer, the term of this patent is extended or adjusted under 35 U.S.C. 154(b) by 1303 days.

(21) Appl. No.: 11/679,474

(22) Filed: Feb. 27, 2007

(65) Prior Publication Data

US 2008/0206397 A1 Aug. 28, 2008

(51) Int. Cl.
*A01K 85/00* (2006.01)
*A01K 97/04* (2006.01)
*A01K 85/01* (2006.01)

(52) U.S. Cl.
CPC .............. *A01K 85/01* (2013.01); *A01K 85/00* (2013.01); *A01K 97/045* (2013.01)
USPC ........................................................ 426/1

(58) Field of Classification Search
USPC ........................................................ 426/1
See application file for complete search history.

(56) References Cited

U.S. PATENT DOCUMENTS

| | | |
|---|---|---|
| 2,874,048 A | 2/1959 | Walldov |
| 2,979,778 A | 4/1961 | FitzSimmons |
| 3,060,620 A | 10/1962 | Binkowski |
| 3,180,049 A | 4/1965 | Gunderson |
| 3,245,171 A | 4/1966 | Henry |
| 3,940,869 A | 3/1976 | Roberts |
| 4,202,905 A | 5/1980 | Asai |
| 4,245,420 A | 1/1981 | Carr |
| 4,463,018 A | 7/1984 | Carr |
| 4,530,179 A | 7/1985 | Larew |
| 4,576,821 A | 3/1986 | Smith |
| 4,634,592 A | 1/1987 | Faber |
| 4,710,385 A | 12/1987 | Vickers |
| 4,731,247 A | 3/1988 | Wolford |
| 4,732,766 A | 3/1988 | Lindgard |
| 4,744,167 A | 5/1988 | Steele |
| 4,764,383 A | 8/1988 | Brown |
| 4,826,691 A | 5/1989 | Prochnow |
| 4,828,829 A | 5/1989 | Bethshears |
| 4,887,376 A | 12/1989 | Sibley |
| 4,901,466 A | 2/1990 | Davis |
| 4,903,430 A | 2/1990 | DeWan |
| 4,927,643 A | 5/1990 | Orazio |
| 4,993,183 A | 2/1991 | Carver |
| 5,063,703 A | 11/1991 | Riley |
| 5,089,277 A | 2/1992 | Prochnow |
| 6,113,895 A | 9/2000 | McCain |
| 6,668,482 B1 | 12/2003 | Ruffin |
| 6,789,349 B1 | 9/2004 | Stone |
| 6,827,930 B2 | 12/2004 | Cobb |
| 2005/0037046 A1 | 2/2005 | Braun |
| 2006/0008445 A1 | 1/2006 | Garralda |

OTHER PUBLICATIONS

"Glycoproteins", retrieved online on Jan. 21, 2014 from www.cs.stedwards.edu/chem/chemistry. pp. 1-6.*
Extended European Search Report for EP 08725992.5, dated Jan. 20, 2012.
Hashimoto, Yoshiro et al., Attractants for eels in the extracts of short-necked clam—I. Survey of constituents eliciting feeding behavior by the omission test, Bull. Jap. Soc. Scientific Fish. 34 (1), pp. 78-83. (1968).
Carr, William E. S. et al., Chemical stimulation of feeding behavior in the pinfish, Lagodon rhornboides: characterization and identification of stimulatory substances extracted from shrimp, Comp. Biochem. Physiol. 54A, pp. 437-441, (1976).
Adron, J.W. et al., Studies on the chemical nature of feeding stimulants for rainbow trout, Salmo gairdneri Richardson, J. Fish Biol. 12, pp. 303-310, (1978).
Fuke, Shinya et al., Identification of feeding stimulants for Red Sea bream in the extract of marine worm Perinereis brevicirrus. Bull. Jap. Soc. Scientific Fish. 47(12), pp. 1631-1635, (1981).

\* cited by examiner

*Primary Examiner* — Elizabeth Gwartney
*Assistant Examiner* — Jenna A Watts

(57) ABSTRACT

A method for packaging is described for enhancing the attractiveness of an artificial hydrophilic polymeric soft fish bait to fish, comprising: immersing or suspending said soft bait in a package with an aqueous suspension of biological fluids from an animal, the water-soluble fraction of biological fluids from an animal, or an artificial simulated fluid thereof, so that the soft bait absorbs said fluid and an animal odor/flavor components contained therein.

22 Claims, No Drawings

PACKAGED ARTIFICIAL SOFT BAITS

FIELD OF THE INVENTION

This invention relates to an improved method of packaging for enhancing the attractiveness of an artificial hydrophilic polymeric soft fish bait to fish, comprising: immersing or suspending said soft bait in a package with an aqueous suspension of biological fluids from an animal, the water-soluble fraction of biological fluids from an animal, or an artificial simulated fluid thereof, so that the soft bait absorbs said fluid and an animal odor/flavor components contained therein.

BACKGROUND OF THE INVENTION

Predatory fish can be extraordinarily sensitive to water-borne substances, for example odors and flavors emanating from natural prey. When fish detect these food odors and flavors, primarily through their senses of smell and taste, they initiate specific food search behaviors that enhance the fish's chances of locating and consuming the food. The overt responses of fish to food odors and flavors have been frequently noted by inventive anglers seeking to increase their catch rates. Numerous patents describe assorted strategies for incorporating various odorous materials into or onto fishing baits and lures. These include patents for directly embodying the attractive gents in a fully or partially water-soluble bait matrix (for example, see Walldov U.S. Pat. No. 2,874,048 (1959); Faber & Kent U.S. Pat. No. 4,634,592 (1987); Vickers U.S. Pat. No. 4,710,385 (1987); Wolford & Greminger U.S. Pat. No. 4,731,247 (1988); De Wan U.S. Pat. No. 4,903,430 (1990); Prochnow U.S. Pat. No. 5,089,277 (1992)), or an essentially water-insoluble bait matrix (for example, see FitzSimons U.S. Pat. No. 2,979,778 (1961); Carr U.S. Pat. No. 4,245,420 (1981); Carr U.S. Pat. No. 4,463,018 (1984); Larew U.S. Pat. No. 4,530,179 (1985); Smith & Daigle U.S. Pat. No. 4,576,821 (1986); Lindgard U.S. Pat. No. 4,732,766 (1988); Brown & Drebot U.S. Pat. No. 4,764,383 (1988); Sibley U.S. Pat. No. 4,887,376 (1989); Carver U.S. Pat. No. 4,993,183 (1991); Riley U.S. Pat. No. 5,063,703 (1991); McCain U.S. Pat. No. 6,113,895 (2000)). Other strategies include various topical applicants for applying attractive odors and flavors to the surfaces of baits and lures (for example, see Prochnow U.S. Pat. No. 4,826,691 (1989); Bethshears U.S. Pat. No. 4,828,829 (1989); Davis U.S. Pat. No. 4,901,466 (1990); Orazio & O'Brien U.S. Pat. No. 4,927,643 (1990); Cobb, Jacobsen & Lupia U.S. Pat. No. 6,827,930 (2004)) and specific scent dispersing systems designed into the bait or lure (for example, see Steele U.S. Pat. No. 4,744,167 (1988); Stone U.S. Pat. No. 6,789,349 (2004)).

The use of artificial polymer-based soft baits in fishing is common, due in part to the high effectiveness of these baits at catching fish. A number of different factors contribute to this effectiveness. For one, soft polymeric baits provide a soft texture and high flexibility that are more compatible with fish oral acceptance than are fish baits made from harder materials, such as wood, metal, and hard plastic. Another contributing factor is the fact that soft baits can be molded or otherwise fashioned into a plethora of different shapes and sizes that are amenable to a wide variety of fishing presentations. Many of these shapes are designed to express specific actions, or swimming performances, when retrieved through the water. To maximize these actions it is especially preferred that soft polymeric baits not only remain soft and flexible but also avoid kinks, bends, and other physical distortions that detract from the desired action of the bait. Still another factor is that soft polymeric baits can be loaded with various attractive odors and flavors that fish find appealing through their exquisite senses of smell and taste.

Owing to the nature of the base polymers from which they are made, soft artificial polymeric fish baits generally fall into one of two categories: those that are hydrophobic and those that are hydrophilic. Hydrophobic baits tend to repel water, or at least resist water penetration into the baits. A prime example of a hydrophobic bait is one made from the standard thermoplastic polymer, polyvinyl chloride resin, dispersed in an organic primary plasticizer (often, but not exclusively, dioctyl phthalate), a secondary hydrocarbon extender, and stabilized with the metallic salts of zinc, cadmium, and barium. The materials used in these baits tend to resist water penetration into the bait and therefore minimize chemical communication between the bait and the surrounding water. In contrast, a hydrophilic bait is more water miscible, and hence water compatible, readily allowing for the deeper penetration and flow of water throughout the polymer matrix that makes up the bait. Examples of hydrophilic bait polymers include natural water miscible, yet water-insoluble polymers, such as proteins and carbohydrates derived from selected plants and animals, and non-natural, or synthetic, polymers such as resins made from polyvinyl alcohol. In many cases simple aqueous slurries of these polymers can be made by mixing a measured quantity of the polymer with water and applying gentle heat and stirring.

Recent commercial introductions of soft hydrophilic polymeric baits have demonstrated greater fish acceptance, and therefore higher fish catch rates, when compared to standard hydrophobic PVC plastic baits. This is especially true when the hydrophilic baits are adequately hydrated so as to possess a soft texture and exhibit sufficient flexibility as to have a good swimming action. The advantages of these baits are even greater when they are loaded with the chemical essence of an appealing food in such a way that they steadily release attractive odors and flavors.

Unfortunately, hydrophilic soft baits suffer the distinct disadvantage of rapidly losing moisture and drying out when exposes to air. If prolonged exposure occurs, this excessive rate of moisture loss eventually leaves the bait hard, stiff, and virtually unusable. The drying issue becomes particularly important when commercially packing hydrophilic soft baits, since even tiny air leaks in the package leads to the steady moisture loss in transit and during storage, possibly leading to baits that are unacceptably hard and stiff by the time they reach the shelf. Moreover, compared to PVC plastic, some hydrophilic polymers have a greater tendency to accept permanent shape distortions, or sets, when bent or forced from their original intended shapes. This deformation issue becomes particularly important in packaging hydrophilic baits. Soft hydrophilic baits that are forcibly pushed or crowded together in a package, as often occurs in dry-packs, tend to suffer significantly higher incidences of kinks, bends, and other shape distortions.

There exists a need, therefore, for an improved method of packaging soft hydrophilic polymeric baits. Specifically, there is a need for an improved packaging method wherein the soft hydrophilic polymeric baits are constantly bathed in fluid medium to maintain a desirable level of hydration so as to ensure proper bait softness and flexibility. Moreover, the advantages of this improved packaging method would be advanced further if the fluid medium was that of the natural juice or body fluid of an animal, or a synthetic simulation thereof, such that the hydrophilic soft baits could be passively charged with the essence of animal life and thereby increase their chemical appeal to fish. This would be especially true when the juices or body fluids are derived from those of common prey, such as baitfish, worms, insects, and shellfish, but the body fluids of some non-prey species can also be expected to offer chemical enhancement. Another advantage would be gained when the improved packaging allowed for the re-introduction of baits that have been chemically spent through normal use such that the baits could be "re-charged" with a fresh supply of appealing odors and flavors. Furthermore, the advantages of the improved packaging system would be advanced still further if the soft hydrophilic polymeric baits were suspended in sufficient fluid to reduce bait crowding and hence the resulting kinks, bends, and other physical distortions common to dry-packs.

SUMMARY OF THE INVENTION

It is an objective of the present invention to provide an improved method of packaging artificial soft hydrophilic polymeric fishing baits wherein the baits are suspended in an aqueous suspension of biological fluids from an animal, the water-soluble fraction of biological fluids from an animal, or an artificial simulated fluid thereof, so that the artificial bait passively absorbs the fluid medium, including the natural flavors and odors contained therein. In this way the soft artificial baits become chemically "charged" with the positive animal smells and tastes that elicit food search behavior in predatory fish. In most cases the preferred source of animal odors and flavors are derived from common prey species, such as baitfish, worms, insects, and shellfish. However, the body fluids of non-prey animals—for example, some avian and mammalian species—can also provide effective sources of positive odors and flavors.

Another object of the present invention is to provide a means wherein the aqueous animal fluid also serves to hydrate the soft artificial baits so as to increase softness and flexibility. Soft artificial baits treated in this manner can display greater action in the water and thereby function more effectively.

An additional object of the present invention is to allow soft artificial baits whose scent loads have been expended through normal use to be easily chemically recharged with the animal-derived odors and flavors that fish find attractive so that the baits again offer a more effective scent release.

A further objective of the present invention is to suspend the artificial soft baits in enough aqueous animal fluids so as to reduce bait crowding. When packed in this way the soft baits suffer fewer kinks, bends, and other physical distortions that tend to detract from the intended motions or actions of the baits.

In accordance with the objectives of the invention, which will become apparent from the description herein, a method to enhance the attractiveness of an artificial hydrophilic polymeric soft fish bait to fish comprises: immersing or suspending said soft bait in a package with an aqueous suspension of biological fluids from an animal, the water-soluble fraction of biological fluids from an animal, or an artificial simulated fluid thereof, so that the soft bait absorbs said fluid and an animal odor/flavor components contained therein.

By packaging of the soft baits immersed or suspended within a package containing an aqueous suspension of biological fluids from an animal, the water-soluble fraction of biological fluids from an animal, or an artificial simulated fluid thereof, the baits remain hydrated so as to increase softness and flexibility, are less crowded so as to avoid physical distortions and when the scent load of the bait is expended it can be easily recharged with the animal-derived odors and flavors that fish find attractive. With all of this in mind, the baits in this manner can display greater action in the water and thereby function more effectively and the baits again offer a more effective scent release upon recharge.

DETAILED DESCRIPTION OF THE INVENTION

In its basic aspect, the improved packaging method according to the invention includes suspending a measured number of soft, artificial, hydrophilic polymer-based baits in a shaped container with a measured amount of a predatory fish stimulant composition comprising an aqueous suspension of biological fluids from an animal, the water-soluble fraction of a biological fluids from an animal, or an artificial simulated fluid thereof so that the ratio of the bait mass and the volume of fluid falls within a defined range.

Suitable hydrophilic polymers are those that mix easily with water to form a slurry or solution which can then processed. Processing generally requires that the slurry or solution be stirred and heated, mixed with preservatives, coloring agents, and other additives, and then allowed to assume a fixed shape as the mixture is cooled. Shaping can be accomplished through injection molding, extrusion, or pouring the heated mixture into a suitable mold or container. Once processed the shaped baits should be essentially water-insoluble, yet water permeable, soft, and flexible. The formed polymer substrate should form a matrix through which water can readily pass so as to allow the bait to passively take up additional water, odors, and flavorants contained in the suspension fluid. The bait should also allow for the release of these substances when fished.

Both natural and synthetic hydrophilic polymers or mixtures thereof can be used. Examples of natural hydrophilic polymers include proteins of the albumin, globulin, glycol protein or phosphoprotein varieties, or those produced by the hydrolysis of animal collagen or other tissues, such as gelatin. Other natural hydrophilic polymers include polysaccharide products, such as starch, dextran, cellulosids, pectin, and gums like xanthum gum, locust bean gum, and guar gum, or the complex polysaccharides derived from agar. Synthetic hydrophilic polymers include those made from polyvinyl alcohol or high molecular weight glycols, for example polyethylene glycol.

Any of the formed soft bait shapes common to the market and recognized by anglers as effective on fish can be used in the present invention. Suitable soft baits shapes are those produced by molding, extrusion, or other shaping process steps to form a wide variety of different body styles, ranging from flat sheets to highly detailed 3-D replications of natural prey. It is generally desired to match the specific bait shape to a container having an appropriate shape and size that easily accommodates the bait. Thus, baits with a long axis, such as those emulating a natural earthworm, might be best fitted in a rectangular plastic tray or a re-sealable plastic bag with a length slightly longer than the bait itself. Conversely, a round plastic pail or bucket might be better suited to hold baits with shorter, rounder profiles as, for example, soft baits shaped like a crab.

Predatory fish stimulant composition used as the packing fluid serves to suspend, hydrate, and bathe the hydrophilic soft baits in a medium that enhances the chemical appeal of the baits. One or more aqueous suspensions of biological fluids from an animal, the water-soluble fraction of biological fluids taken from a variety of animals can be used in the stimulant composition. In its most preferred embodiment, the fluid is derived from a list of animal types, principally common prey species, known to be chemically attractive to fish. For commercial purposes, it is also best if the animal type is available in bulk quantities. Thus, the body fluids can be derived from common commercially available fish such as minnows, chubs, herrings, shads, anchovies, sardines, pilchards, salmons, tunas, mackerels, cods, and haddocks; common commercial worms, for example various earthworms like nightcrawlers, red worms, and angle worms, leeches, or marine worms like bloodworms or sandworms; different species of insects, such as grasshoppers and crickets, or the many worm-like larval forms typical of various insect species, for example catalpa worms, waxworms, wigglers, and grubs; and the numerous commercially available shellfish, such as shrimp, lobsters, krill, crayfish, crabs, squid, cuttlefish, octopus, clams, mussels, scallops, oysters, various species of micro-crustaceans such as brine shrimp and copepods, or general zooplankton.

Fluids taken from other animal types, though not recognized as common prey but still known for their fish-catching effectiveness, can be used in the stimulant composition used as a packing fluid. This includes, for example, the body fluids of different avian species like chickens, turkeys and waterfowl, and the body fluids of different mammalian species like cows and pigs.

Stimulant composition comprises one or more fluid types (e.g., the blood, plasma, lymphatic, or cavity fluids) taken from acceptable avian, mammalian, and piscine species, or the fluids gathered from the varied species of crustaceans during their molting stages. More often, however, the fluids are derived from the aqueous fraction of a fluid mixture, gathered during the processing of these animals for human or pet food, wherein the mixture may contain a variety of different fluids collected from different sources within the animal. In their raw forms the fluid mixtures may include crude contributions from the blood, lymphatic system, nervous system, cells, interstices, and various body cavities. The particular mixture obtained depends on how the animal being processed is cut, dismembered, ground, pressed or otherwise handled. Or, a general water-soluble fraction can be had by first pulverizing or grinding the animal tissue, or subjecting it to partial or full hydrolysis or enzymatic digestion, and then extracting the product with water.

The fluid types for the stimulant composition may be used in their raw form, but are preferably further fractionated and filtered to remove unwanted oils, fats, and particulates that detract from their aesthetic appearance. Moreover, it is equally acceptable to use the aqueous fractions in their original hydrated state or to use their dehydrated liquid concentrates that are later re-constituted with added water. Likewise, dry powders produced by spray-drying or freeze-drying the original liquid, or water-soluble fractions of the animal that again are later re-constituted in water function are satisfactory. Assorted, commercially prepared, dehydrated animal extracts are also available from various suppliers.

Alternatively, instead of using fluids taken from once-live animals, it is possible, in those cases where the chemical recipes are known, to fashion a synthetic mixture that simulates the active components within a water-soluble fraction taken from a particular animal species. Several of these recipes for different animal species are shown in Table 1. In many cases, the synthetic simulations have been reported to be as effective as their natural counterparts in stimulating fish food search and/or feeding behavior.

TABLE 1

Sample recipes for the synthetic simulation of different marine organisms

| | (i) Source and Organism | | | |
|---|---|---|---|---|
| Component (mg/100 ml) | Hashimoto et al. 1968 Clam | Fuke et al. 1981 Marine worm | Carr & Chaney 1976 Shrimp | Mackie & Adron 1978 Squid |
| L-alanine | 130 | 285 | 34 | 294 |
| L-valine | 14 | 52 | 5 | 39 |
| L-leucine | 2 | 42 | 5 | 59 |
| L-isoleucine | 11 | 54 | 2 | 31 |
| L-methionine | 11 | 27 | 2 | 39 |
| L-proline | 16 | 217 | 31 | 1566 |
| Hydroxyproline | | | 6 | |
| L-phenylalanine | 20 | 22 | 2 | 31 |
| L-tryptophan | | 4 | | |
| Glycine | 329 | 508 | 159 | 959 |
| L-serine | 24 | 94 | 3 | 36 |
| L-threonine | 13 | 59 | 2 | |
| L-tyrosine | 16 | 24 | 2 | 24 |
| L-asparagine | | | 5 | |
| L-glutamine | | | 25 | |
| L-aspartic acid | 21 | 97 | 2 | 19 |
| L-glutamic acid | 103 | 196 | 3 | 57 |
| L-lysine | 25 | 64 | 5 | 13 |
| L-arginine | 94 | 22 | 63 | 297 |
| L-histidine | 9 | 39 | 2 | |
| Taurine | 664 | 371 | 51 | 362 |
| Betaine | 679 | 573 | 448 | 978 |
| Homarine | 63 | 124 | | |
| Hypoxantine | 10 | | | 51 |
| Inosine | 29 | | | 26 |
| 5'-AMP | 5 | 65 | | 43 |
| 5'-UMP | 15 | 4 | | |
| 5'-IMP | 36 | 10 | | |
| 5'-ADP | 6 | 8 | | |
| 5'-ATP | | 5 | | |
| Fumaric acid | 4 | 1 | | |
| Succinic acid | 35 | 24 | | |
| Malic acid | 16 | 15 | | |
| Lactic acid | | | | 98 |
| Maltose | | 287 | | |
| Glucose | | 75 | | |
| Trimethylamine | | 1 | | 98 |
| Trimethylamine oxide | | 2 | | 1219 |

Regardless of the source of the aqueous fluid or how it is prepared, the fluid must be preserved to retard microbial spoilage. Standard food grade preservatives, with or without acidification, suffice for this purpose. Preservatives added at a level generally less than 5% by weight of the fluid offer effective protection against spoilage. Examples of some acceptable preservatives include the parabens, methyl, propyl, and the combination thereof (available commercially from Inolex Personal Care Products or Malinekrodt); Butylated Hydroxyanisole, BHA (3,5-Di-tert-Butyl-4-Hydroxyanisole) and Butylated Hydroxytoluene, BHT (2,6-Di-tert-Butyl-p-Cresol), both available commercially from Kraft Chemical Co.; DMDM hydantoin (1,3-dimethylol-5,5-dimethyl-hydantoin, available through McIntyre Chemical Company); and Germall II (diazolidinyl urea, available from Sutton Labs); potassium sorbate, citric acid, sorbic acid, and sodium propionate (available from Universal Preservachem, Inc).

Other ingredients can be incorporated into the fluid recipe for additional desired effects in texture, color, and preservation. For example, the viscosity of the liquid can be increased by adding one or more water-soluble cellulose ethers having molecular weights between about 100,000 to 500,000, usually at a 0.5-5% level by weight. Preferred ethers include methylcellulose, hydroxyethyl cellulose, hydroxypropyl cellulose, methyl hydroxypropyl cellulose, hydroxyethyl cellulose, methyl hydroxybutyl cellulose, carboxymethyl cellulose, carboxymethyl methyl cellulose, hydroxyethyl hydroxypropyl methyl cellulose, and methyl hydroxyethyl cellulose. Likewise, alkylene glycols, such as ethylene glycol or propylene glycol, of which the latter is preferred, can be added to from about 1-40% to prevent freezing. Standard FD&C food grade colorants can be added singly or in mixtures to enhance the esthetic appeal of the liquid or to simulate the color of specific natural materials, such as blood.

Experience has taught that keeping the fluid volume and bait mass within a defined ratio range fulfills the objectives of this invention while simultaneously avoiding excessive amounts of fluid in the package. In general, it is best to keep the bait mass (grams) to fluid volume (in milliliters) ratio within a range of 0.01-10.0, with the preferred ratio range in most instances falling between 0.2-0.8

(b) EXAMPLES

In each of the examples below, the suspension fluids were obtained by first preparing the base liquid mixture and then adding the other ingredients as desired. Mixing is complete when all of the soluble agents are completely dissolved and evenly dispersed. Following its completion, an appropriate amount of the liquid is then added to a water-tight container holding the established number or mass of hydrophilic soft baits. The container is then closed and appropriately sealed.

While advantageous embodiments have been chosen to illustrate the invention, it will be understood by those skilled in the art that various changes and modifications can be made therein without departing from the scope of the invention as defined in the appended claims.

(i) Example 1

Molded 6" soft bait bloodworms packaged in a 2" w×2.5" h×6.5" l resealable plastic tray and immersed in artificial blood.

| Liquid Components: | Weight Percent |
|---|---|
| Base liquid: | |
| Sterile commercial chicken plasma | 84.30 |
| Preservatives | 4.20 |
| Propylene glycol | 10.00 |
| FD&C red | 1.50 |

Thirty molded bloodworms (104 g total) are added to the tray and covered with 272 ml of artificial blood.

Example 2

Molded 4" minnows packaged in a 4" h×6" l resealable plastic bag with a 2" expandable pouch, immersed in fish extract.

| Liquid Components: | Weight Percent |
|---|---|
| Base liquid: | |
| Water | 75.80 |
| Powdered anchovy extract | 5.00 |
| Preservatives | 4.20 |
| Propylene glycol | 15.00 |

Ten molded minnows (65 g total) are added to the plastic bag and covered with 150 mls of the fish extract.

Example 3

Molded 2" clams packaged in a "x5" circular plastic bucket, immersed in thickened synthetic clam juice (Hashimoto et al. 1968).

| Liquid Components: | Weight Percent |
|---|---|
| Base liquid: | |
| Water | 61.032 |
| L-arginine | 0.094 |
| L-lysine | 0.025 |
| L-histidine | 0.009 |
| L-phenylalanine | 0.020 |
| L-tyrosine | 0.016 |
| L-leucine | 0.020 |
| L-isoleucine | 0.011 |
| L-methionine | 0.011 |
| L-valine | 0.014 |
| L-alanine | 0.130 |
| L-proline | 0.016 |
| L-glutamic acid | 0.103 |
| L-serine | 0.024 |
| L-threonine | 0.013 |
| L-aspartic acid | 0.021 |
| Glycine | 0.329 |
| Taurine | 0.664 |
| Cystine | 0.050 |
| Glycine betaine | 0.679 |
| Homarine | 0.063 |
| Hypoxanthine | 0.010 |
| Inosine | 0.029 |
| Uridine-5'-monophosphate | 0.015 |
| Adenosine-5'-,monophosphate | 0.005 |
| Inosine-5'-monophosphate | 0.036 |
| Adenosine-5'-diphosphate | 0.006 |
| Malic acid | 0.016 |
| Succininc acid | 0.035 |
| Fumaric acid | 0.004 |
| Preservatives | 3.500 |
| Propylene glycol | 30.000 |
| Cellulose thickener | 3.000 |

Thirty molded clams (259 g total) are added to the plastic bucket and covered with 449 ml of synthetic crab juice.

What is claimed is:

1. A method of reducing physical deformation during storage in packaged artificial fishing bait product and enhancing the attractiveness to fish of an artificial, hydrophilic, polymeric soft fish bait in the packaged product, said method comprising:
placing a mass of soft baits and a volume of an aqueous suspension in a package, said aqueous suspension comprising (i) a predatory fish stimulant fluid composition, (ii) a water-based fraction of predatory fish stimulant fluid composition, or (iii) an artificial simulated predatory fish stimulant fluid composition to produce a packaged artificial hydrophilic polymeric soft fish bait containing an amount of said aqueous suspension sufficient to suspend said soft bait in said aqueous suspension to reduce crowding and physical distortion and maintain hydration of said soft fish bait during storage and retain flexibility and retain swimming action of said soft baits wherein said aqueous suspension is added to said container in an amount to provide a soft bait mass (grams) to fluid volume (ml) ratio of about 0.01-10.

2. A method according to claim 1, wherein said soft fish bait is made from a synthetic hydrophilic polymer made from polyvinyl alcohol.

3. A method according to claim 1, wherein said soft fish bait is made from a synthetic hydrophilic polymer made from high molecular weight glycols.

4. A method according to claim 3, wherein said soft fish bait is made from a synthetic hydrophilic polymer made from high molecular weight polyethylene glycol.

5. A method according to claim 1, wherein said predatory fish stimulant fluid composition is derived from a fish, worm, insect, shellfish, bird, or mammal, or an artificially simulated fluid from a fish, worm, insect, shellfish, bird, or mammal.

6. A method according to claim 5, wherein said predatory fish stimulant fluid composition comprises a fluid from (a) a species of fish selected from the group consisting of a minnow, chub, herring, shad, anchovy, sardine, pilchard, salmon, tuna, mackerel, cod, and haddock, or (b) an artificially simulated fluid thereof.

7. A method according to claim 5, wherein said predatory fish stimulant fluid composition comprises a fluid from a species of worm selected from the group consisting of earthworm, nightcrawler, red worm, angle worm, leech, marine bloodworm, marine sandworm, or an artificially simulated fluid thereof.

8. A method according to claim 5, wherein said predatory fish stimulant fluid composition comprises a fluid from an adult or larval form of an insect species selected from the group consisting of grasshopper, cricket, catalpa worm, waxworm, wiggler, grub or an artificially simulated fluid thereof.

9. A method according to claim 5, wherein said predatory fish stimulant fluid composition comprises a fluid from a species of shellfish selected from the group consisting of shrimp, lobsters, hill, crayfish, crabs, squid, cuttlefish, octopus, clams, mussels, scallop, oysters, brine shrimp, copepods, zooplankton, or artificially simulated fluid thereof.

10. A method according to claim 5, wherein said predatory fish stimulant fluid composition comprises a fluid from a bird selected from the group consisting of chicken, turkey, and water-fowl, or an artificially simulated fluid thereof.

11. A method according to claim 5, wherein said predatory fish stimulant fluid composition comprises a fluid from a mammal selected from the group consisting of cow and pig, or an artificially simulated fluid thereof.

12. A method according to claim 1, further comprising:
recharging said bait after use by re-immersing said soft bait into said predatory fish stimulant fluid composition to re-absorb said predatory fish stimulant fluid composition.

13. A method according to claim 1, wherein suspension of said soft bait into said fluid reduces kinks, bends, and other shape distortions.

14. A method for packaging artificial hydrophilic polymeric soft fish baits and reducing physical distortion of said bait during storage comprising the step of packaging the soft fish baits in an aqueous suspension in a container, wherein the soft baits are suspended in an effective amount of said aqueous suspension to reduce crowding, physical distortion and dehydration of said soft baits, said aqueous suspension comprising (i) a predatory fish stimulant fluid composition, (ii) a water-based fraction of a predatory fish stimulant fluid composition, or (iii) an artificial simulated predatory fish stimulant fluid composition, so that the soft bait absorbs said predatory fish stimulant fluid composition, wherein a ratio of soft bait mass (grams) to fluid volume (ml) is within the range of about 0.01-10.

15. A method according to claim 14, wherein a ratio of soft bait mass (in grams) to fluid volume (in milliliters) is within the range of about 0.2 to about 0.8.

16. The method of claim 14, wherein said soft fish baits are made from a hydrophilic polyvinyl alcohol polymer.

17. A method of packaging and storing soft fish baits made from a hydrophilic polyvinyl alcohol polymer, said method comprising the steps of:
placing the soft baits and an aqueous suspension in a container, the aqueous suspension being added in an amount sufficient to suspend said soft baits in said aqueous suspension to reduce crowding and physical distortion of said soft baits in the container during storage; and
closing and sealing said container to maintain said soft baits suspended in said aqueous suspension, wherein said aqueous suspension is added to said container in an amount to provide a soft bait mass (grams) to fluid volume (ml) ratio of about 0.01-10 during storage.

18. The method of claim 17, wherein said aqueous suspension is added to said container in an amount relative to the amount of fish baits to reduce the formation of kinks and bends in the fish baits during storage.

19. The method of claim 17, wherein said aqueous suspension is added to said container in an amount to provide a soft bait mass (grams) to fluid volume (ml) ratio of 0.2 to 0.8.

20. The method of claim 17, wherein said aqueous suspension comprises at least one fish stimulant in an amount to infuse into said fish baits during storage.

21. The method according to claim 1 wherein said ratio is within a range from about 0.2-0.8.

22. A method according to claim 2, further comprising:
recharging said bait after use by re-immersing said soft bait into said predatory fish stimulant fluid composition to re-absorb said predatory fish stimulant fluid composition.

* * * * *